(12) United States Patent
Wesenhagen

(10) Patent No.: US 6,390,823 B1
(45) Date of Patent: May 21, 2002

(54) GOLF ALIGNMENT TRAINER

(76) Inventor: Humphrey E Wesenhagen, P.O. Box 2714, Saratoga, CA (US) 95070

(*) Notice: Subject to any disclaimer, the term of this patent is extended or adjusted under 35 U.S.C. 154(b) by 0 days.

(21) Appl. No.: 09/407,527

(22) Filed: Sep. 28, 1999

(51) Int. Cl.$^7$ ............................................. A63B 69/26
(52) U.S. Cl. ........................................ 434/252; 473/210
(58) Field of Search ............................ 434/252, 247; 473/207, 208, 210; 351/53, 59, 103, 105, 107

(56) References Cited

U.S. PATENT DOCUMENTS

| | | | | |
|---|---|---|---|---|
| 4,063,740 A | * | 12/1977 | Mader | 473/210 |
| 4,531,743 A | * | 7/1985 | Lott | 473/210 |
| 4,696,111 A | * | 9/1987 | Gardner | 473/210 X |
| 4,789,159 A | * | 12/1988 | Kane | 473/210 |
| 4,852,882 A | * | 8/1989 | Otsuka et al. | 473/210 |
| 4,957,295 A | * | 9/1990 | McConkey | 473/210 |
| 4,969,649 A | * | 11/1990 | Lugiewicz | 473/210 |
| 4,991,849 A | * | 2/1991 | Fabanich | 473/210 |
| 5,413,346 A | * | 5/1995 | Hedlund et al. | 473/210 |
| 5,538,250 A | * | 7/1996 | Putz | 473/210 |
| 5,560,607 A | * | 10/1996 | Macroglou | 473/210 |
| 5,752,887 A | * | 5/1998 | Baldwin, IV | 473/210 |
| 5,913,722 A | | 6/1999 | Kwakkel | 472/267 |
| 6,070,978 A | * | 6/2000 | Temming | 351/103 |

* cited by examiner

Primary Examiner—Kien T Nguyen
(74) Attorney, Agent, or Firm—Robert Samuel Smith

(57) ABSTRACT

A device for training a golfer not to turn his head as he hits the ball including a visor that snaps down in front of the golfer's face and interrupts his line of sight to the ball. The golfer views the ball through a low power lens that is attached to the center of the visor. The lens has alignment marks which the golfer aligns with target marks on the gound When the golfer strikes the ball, the ball will disappear from the field of view but, if the golfer succeeds in sutaining his head position, the alignment marks will remain aligned with the target marks. In one embodiment, the device is worn like a pair of glasses. In another embodiment, the visor is attached to a cap worn by the golfer. The distance from the visor to the golfer's face is adjustable.

3 Claims, 2 Drawing Sheets

GOLF ALIGNMENT TRAINER

FIELD OF THE INVENTION

This invention relates to training devices for improving a golfer's ability to putt and particularly to a device to train the golfer to keep his head down and pointed toward the point of contact with the ball after the ball has been struck.

PRIOR ART AND INFORMATION DISCLOSURE

Many people are fascinated by the game of golf because it combines a requirement for highly developed judgement coupled with very precise body control.

Every instructor has a list of tips for improving his pupils stroke such as how to stand, how to turn his shoulders, how to position his elbows, etc. Many devices have appeared on the market which are training aids for helping the golfer to develop these characteristics of his swing For example, U.S. Pat. No. 5,913,732 to Kwakkel discloses a "Golf Putting Vertical Alignment and Training Aid" comprising a reflective sheet positioned on the ground at a distance from the golf ball. A string or wire is suspended over the ball with one end attached to an elevated support positioned behind the sheet and stretched over the sheet, the ball, a cup and is attached to another elevated support placed on the other side of the cup opposite the ball. The golfer, addressing the ball utilizes the reflection of the elongated material to position his eyes substantially vertically overtop the string and assist the golfer to direct his swing to hit the ball along a target line to the cup.

U.S. Pat. No. 3,721,447 to Louderback describes a ball covered with Velcro ™ loop material that adheres to the striking surface of a club covered with VELCRO hook material when the ball is struck by the club.

U.S. Pat. No. 5,026,064 to Novosel discloses a training head that, when the club is swung, strikes a moveable upright target composed of yieldable light weight material that becomes attached to the head. The addition of the target to the head provides increased resistance to train the player to increase head speed at impact and beyond. Emphasis on the training effect is to present "a relatively large target surface that the player strikes with the head of the training club thereby encouraging the player to relax due to the size of the target and the absence of any requirement other than to strike it." The surfaces of the target and club head are covered with velcro ™ in order to that the target stick to the club head.

U.S. Pat. No. 5,782,701 to O'Bryan discloses a golf practice aid comprising a deformable inner core and an outer energy absorbing cover that makes a sound and sticks bu hook and loop material to a striking surface when struck by the club head.

U.S. Pat. No. 3,549,300 to Pelz discloses a putter having a curved shaft and alignment marks on the shaft.

U.S. Pat. No. 3880,430 to McCabe discloses the head of a golf club with members extending away from the striking surface and away from the target hole which have two sets of indicia, each set being located at a different level and one set arranged to lie between portions of the other set.

One very common admonition pressed upon the student golfer by most all instructors is the importance of not lifting the head to follow the flight of the ball when the ball is hit. The oft repeated instruction is "Keep your head down!" Yet this undesirable motion persists even in experienced golfers because of their anxiety to determine if their drive sent the ball as far in the right direction as they had hoped. None of the cited art discusses this problem nor provides a training device that breaks this specific habit.

SUMMARY OF THE INVENTION

It is an object of this invention to provide a device that trains the golfer to keep his head in the proper position during his stroke.

This invention is directed toward a visor that is mounted on the golfer's head. The visor has a lens area with a mark that the golfer through which the golfer views both marks and positions his head so that the mark on the visor is aligned with the mark on the ground. Before during and after the golfer strikes the ball, he maintains the alignment in his field of view by not turning his head.

DESCRIPTION OF A BEST MODE

Figure 1A:
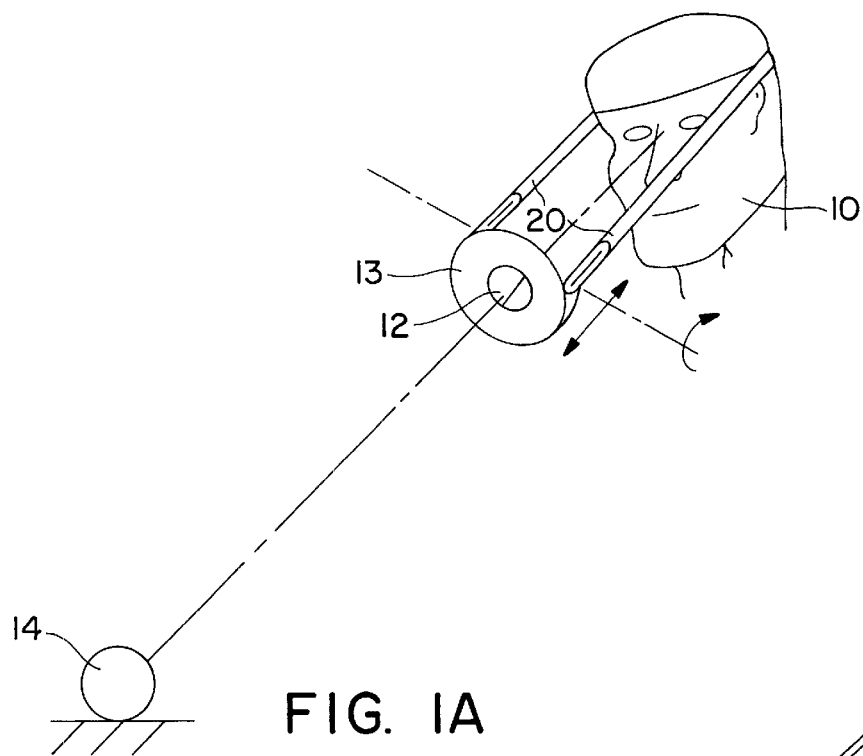
FIG. 1A shows one embodiment of the invention on the head of a golfer.
Figure 1B:
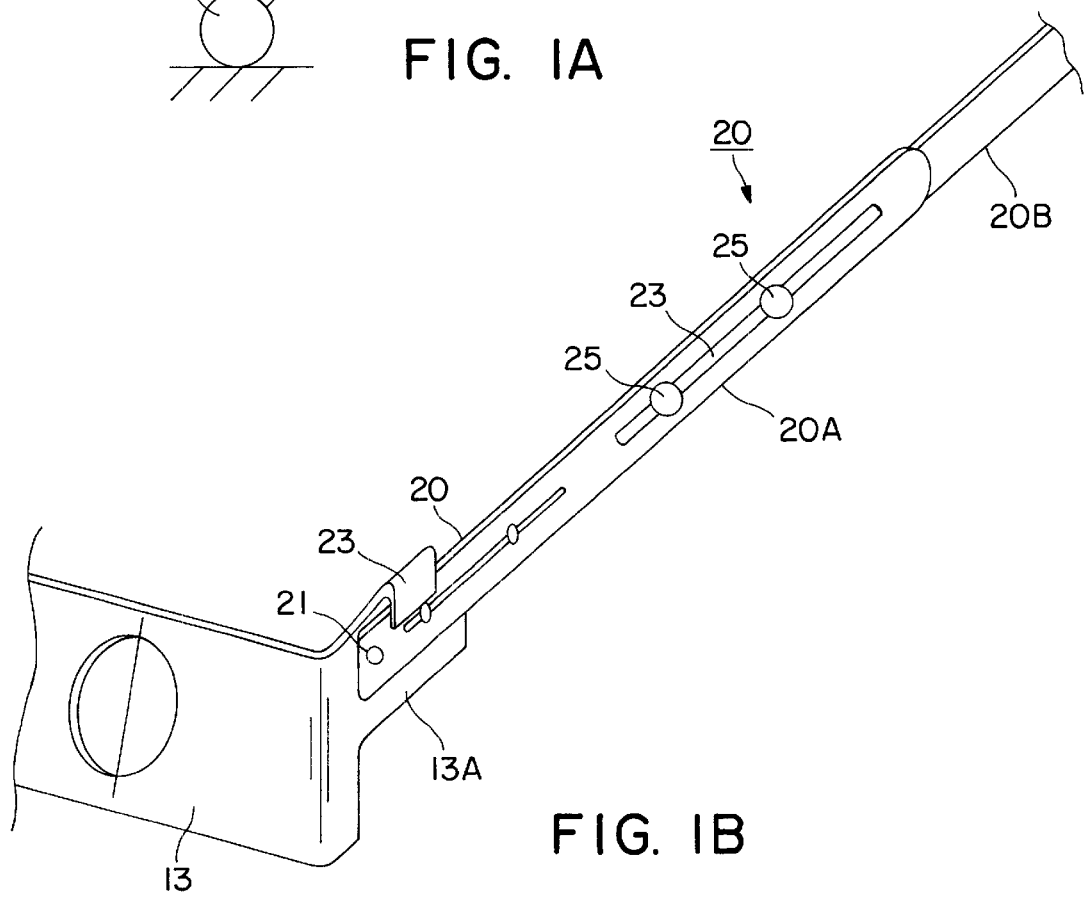
FIG. 1B shows details of the supporting legs.
Figure 2:
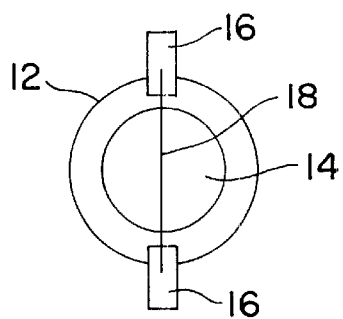
FIG. 2 shows the view the golfer sees before hitting the ball.

Turning now to a discussion of the drawings, FIG. 1 lays out the principles of the invention showing a golfer 10 peering through a lens 12 at a golf ball 14 on the ground as he prepares to stoke the ball. The lens 12 is a slight magnifier. The lens is supported in a visor 13 worn on the golfer's head. FIG. 2 illustrates what the golfer sees through the lens 12 being the ball 14 positioned between two target marks 16 on the ground aligned with a line 18 (mark) on his lens 12.

Figure 3:
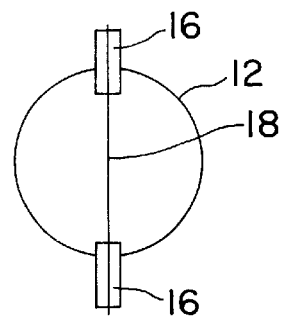
FIG. 3 shows the view the golfer sees after hitting the ball.

FIG. 3 is the golfer's view after he has struck the ball 14 and if he has maintained the marks in alignment by not turning his head. The ball 14 has disappeared from the field of view and the mark 16 remains aligned with the mark 18 on the lens. FIGS. 1A–B shows one embodiment for supporting the visor 13 on the golfer's head. The visor 13 has an angle section 13A that is swivally attached to an end of arm 20 by pin 21. A limit 23 limits the range of rotation of the visor. The swivel attachment of the visor to the pair of legs enables the golfer to "flip" the visor up and out of his field of view when he desires to stroke the ball without using the visor.

FIG. 1B also shows arm 20 comprising arm section 20A and arm section 20B. Arm section 20A has a slot 23 with pins 25 extending through slot 23 and into section 20B so that the overall length of arm 20 is adjustable.

Figure 4:
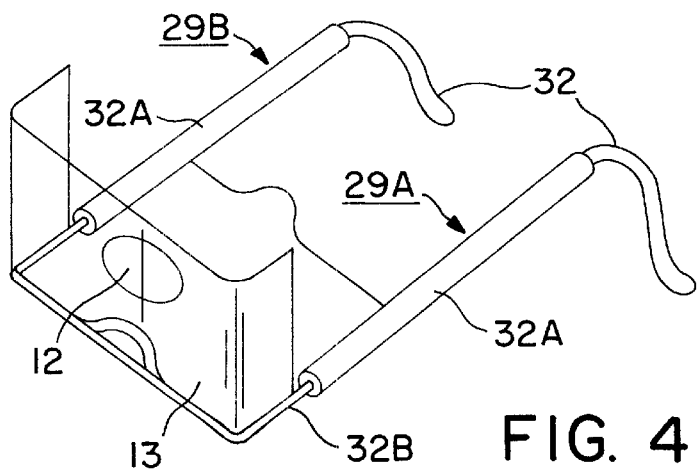
FIG. 4 shows another arrangement for supporting the visor.

FIG. 4 shows another arrangement for supporting the visor in the field of view. The visor 13 is worn like a "pair of glasses" and includes two legs 29A and B. Legs 29A and B each have ear attachments 32 on one end. Each leg comprises two sections, one section being a tube 32A that telescopes onto a rod section 32B whose other end is attached to the visor 13. The rod section 32B is slidably adjustable with tube section 32A enabling the golfer to adjust the distance between the golfer's face and the visor.

Figure 5:
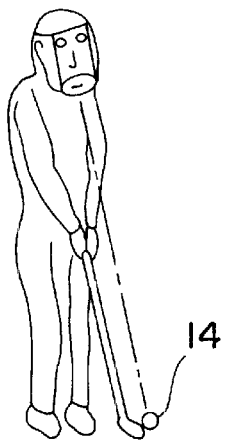
FIG. 5 shows a golfer wearing the device.

FIG. 5 shows a golfer wearing the device 10 and ready to hit the ball 14.

Modifications and variation s of this invention may be contemplated after reading the specification and studying the invention that are within the scope of the invention. I therfore wish to define the scope of my invention by the appended claims.

I claim:

1. A training device for golfer's which comprises:
   a lens;
   a visor wherein said lens is positioned in a center of said visor;
   a cap;
   a pair of legs, each leg having one end rigidly mounted to said cap;
   each one of said pair of legs having another end swivally attached to an edge of said visor opposite another one of said pair of legs swivally attached to an opposite edge of said visor;
   alignment marks on said lens arranged to provide that when said golfer addresses said ball, he is enabled to view said ball through said lens and align said alignment marks with target marks on a surface supporting said ball;
   each leg of said pair of legs comprising two leg sections, one of said leg section having a slot and joined to said other leg section in an operable arrangement to enable an overall length of each of said leg to be adjusted.

2. A training device for golfer's which comprises:
   a lens;
   means for supporting said lens in the field of view of the golfer addressing a golf ball preparatory to driving said golf ball;
   a pair of legs;
   each leg comprising a tube section having one end telescoping onto one end of a rod section;
   each said rod section having another end contoured to engage an ear of said user;
   each said tube section having another end joined to an edge of said lens opposite another edge of said lens joined to another end of said other tube section;
   a cross member having one end secured to one of said legs and another end of said cross member secured to another one of said legs;
   said cross member operably contoured to permit a golfer to position said lens in his line of vision with ends of said legs adapted to engage ears of said golfer and said cross member adapted to rest on a nose of said golfer;
   an alignment line centrally located on said lens arranged to provide that when said golfer addresses said ball, he is enabled to view said ball through said lens and align both eyes said alignment line with target marks on a surface supporting said ball.

3. A method for training a golfer to keep his head positioned with his line of sight fixed before, during and after striking the ball on a location of said ball before said ball is struck, which includes the steps:
   placing on his head a raining device which includes:
   (i) a lens;
   (ii) means for supporting said lens in the field of view of the golfer addressing a golf ball preparatory to driving said golf ball:
   (iii) an alignment line (18) centrally located on raid lens arranged to provide that when said golfer addresses said ball, he is enabled to view said ball through said lens and align with both eyes said alignment line with target marks on a surface supporting said ball;
   addressing the ball with his head positioned to view the ball through said lens with said alignment line aligned with said target marks;
   driving sad ball while maintaining said target marks aligned with said alignment line in his field of view.

* * * * *